No. 668,690. Patented Feb. 26, 1901.
P. F. RIBBE.
ELECTRIC ACCUMULATOR.
(Application filed Apr. 30, 1900.)
2 Sheets—Sheet 1.
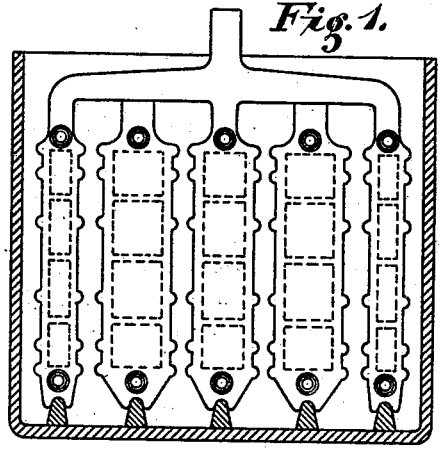
Fig. 1.
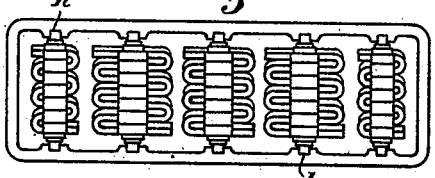
Fig. 2.
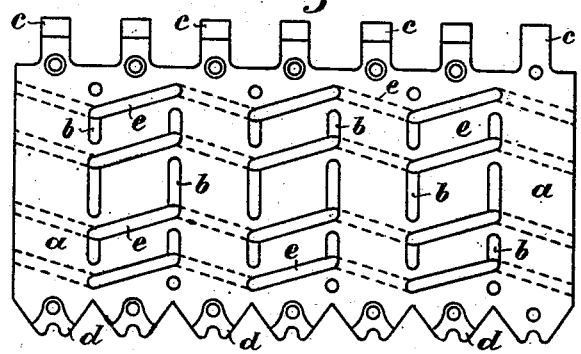
Fig. 3.
Fig. 3ª.
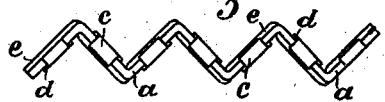
Fig. 4.
Fig. 5.
WITNESSES:
Ella L. Gilee
Clara W. Frohbach
INVENTOR
Paul Ferdinand Ribbe
BY
Richardson
ATTORNEYS.
THE NORRIS PETERS CO., PHOTO-LITHO., WASHINGTON, D. C.

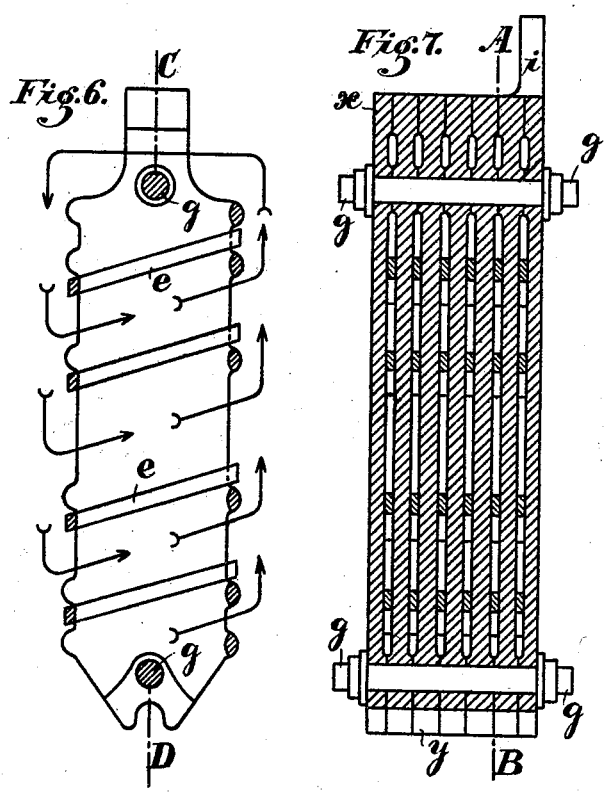

UNITED STATES PATENT OFFICE.

PAUL FERDINAND RIBBE, OF CHARLOTTENBURG, GERMANY.

ELECTRIC ACCUMULATOR.

SPECIFICATION forming part of Letters Patent No. 668,690, dated February 26, 1901.

Application filed April 30, 1900. Serial No. 14,974. (No model.)

*To all whom it may concern:*

Be it known that I, PAUL FERDINAND RIBBE, engineer, a subject of the King of Prussia, German Emperor, residing at the city of Charlottenburg, in the Kingdom of Prussia, German Empire, have invented certain new and useful Improvements in Electric Accumulators, of which the following is a full, clear, and exact description.

The present invention relates to accumulators in which large plates with a number of vertical slots are folded together alternately right and left. The distance necessary for the action of the electrolyte of the opposed active surfaces of the same electrode is obtained by means of interposed bands. The long slots likewise required for the plait-like folding according to the present invention present at the same time the considerable advantage of facilitating the entrance of the electrolyte fluid to the active faces of the same electrode, as well as the conduction of current between electrodes of different polarity. In order to obtain a good circulation of the electrolyte in one and the same electrode and also to facilitate the escape of the gases evolved when strongly charged, the above-mentioned bands or linings are arranged diagonally.

Finally the present invention admits of a very simple, though thoroughly reliable, method of securing the electrodes in the accumulator vessel.

The object of the present invention is illustrated in the accompanying drawings, in which—

Figure 1 shows a front view of an accumulator containing two positive and three negative plates, the vessel being shown in section. Fig. 2 is a plan view of the accumulator. Fig. 3 shows the large plate employed before it has been folded. Fig. 3ª is an edge view of the plate shown in Fig. 3. Fig. 4 illustrates one stage of the folding. Fig. 5 shows the plate folded. Fig. 6 is a section through the single plate on the line A B of Fig. 7. Fig. 7 is a section on the lines C D of Fig. 6.

The large plate $a$, more particularly illustrated in Fig. 3, is provided with oblong slots $b$, so that it can be folded in plaits by means of a suitable machine or by hand. The plate can be designed in any manner, form, or arrangement preferred for receiving the active mass—for instance, ribs, reticulations, perforations, or the like may be employed. The dotted lines of Fig. 1 indicate a simple gridiron frame. Obviously, however, any other form preferred could be employed, as the manufacture of the plates to be folded in any suitable way before or after their completion admits of the most various modifications, and it is likewise quite immaterial whether the plate be cast, rolled, or stamped.

Fig. 4 shows a stage of the folding process. The arrows indicate the direction of folding.

Fig. 3 shows the plate intended to form a single electrode, while Fig. 5 illustrates a folded electrode.

The plate $a$ is provided with a number of projections $c$ and feet $d$, which correspond to the divisions of the plate constituted by the slots $b$. The projections $c$ serve for receiving and conducting the current, while the feet $d$ rest on suitable supports of the accumulator vessel. In order that when the separate plates are folded their lower divisions may have adequate intermediate spaces for the passage of the electrolyte, perforated strips $e$ of an acid-proof conductor or non-conductor are drawn zigzag through the slots $b$ or suitable openings, so that they rest alternately against one or the other side of the plate. By means of this zigzag arrangement of these strips I attain that after the frame or plate has been folded the said strips are all in the same direction at the same angle to the horizon, Fig. 6, and so force the electrolyte during charging to circulate in the direction of the arrows. The plate ready folded, Fig. 5, after insertion of the strips is now united with others to form a cell, Fig. 2, and can be kept in a vertical position by means of hardened lead pins $g$, Fig. 7, in corresponding slots $h$ of the walls of the vessel, Fig. 2. The folded plate is finally soldered at the top and bottom at $x$ and $y$, Fig. 7, and provided with the projection $i$ at the top.

As already stated, the present system can be employed with pure sheet-lead plates as well as with plates with inserted active mass.

It is obvious without further explanation that in consequence of the special construction of the separate electrodes the actual active faces of two plates of opposite polarity are not opposite to each other, but that this is only the case with regard to the separate parts of one and the same electrodes. Consequently if any of the active mass falls out it can only be in a position in which no injurious effects therefrom are to be feared.

Moreover, this new form of construction presents the advantage that the so-called "creeping" of the positive plates, which, as well known, frequently results in their becoming crooked, is obviated completely. Finally the new arrangement offers a simple system for making laminated lead plates with larger surface on the Planté system.

By a suitable selection of the means employed in the present invention light but strong accumulators can be made such as are required for traction and transport purposes.

Having now described my invention, what I claim as new, and desire to secure by Letters Patent, is—

1. In an electric accumulator, the combination of the folded plate having slots, and strips threaded through said slots holding the folds of the plate separated, substantially as described.

2. An electric accumulator comprising a folded plate having openings $b$ therein, and a strip passing through said openings in a zigzag direction, substantially as described.

3. In combination, the plate having the openings $b$ therein, and folded at said openings, said plate having feet and a series of projections $c$, forming terminals of the plate substantially as described.

In witness whereof I have hereunto set my hand in presence of two witnesses.

PAUL FERDINAND RIBBE.

Witnesses:
WOLDEMAR HAUPT,
HENRY HASPER.